(12) United States Patent
Huang et al.

(10) Patent No.: US 12,392,704 B2
(45) Date of Patent: Aug. 19, 2025

(54) APPARATUS AND METHOD FOR DETERMINING THE STATIC PROPPANT-SETTLING-VELOCITY IN FRACTURING FLUIDS

(71) Applicants: CNPC USA CORPORATION, Houston, TX (US); BEIJING HUAMEI INC., Beijing (CN); China National Petroleum Corporation, Beijing (CN)

(72) Inventors: Jiangshui Huang, Sugar Land, TX (US); Lijun Lin, Katy, TX (US); Genyao Lin, Houston, TX (US); Fuchen Liu, Beijing (CN); Jianshen Li, Beijing (CN)

(73) Assignees: CNPC US Corporation, Houston, TX (US); Beijing Huamei, Inc., Beijing (CN); China National Petrolum Corporation, Beijing (CN)

( * ) Notice: Subject to any disclaimer, the term of this patent is extended or adjusted under 35 U.S.C. 154(b) by 348 days.

(21) Appl. No.: 17/941,633

(22) Filed: Sep. 9, 2022

(65) Prior Publication Data

US 2024/0085300 A1    Mar. 14, 2024

(51) Int. Cl.
*G01N 15/04* (2006.01)
*C09K 8/80* (2006.01)

(52) U.S. Cl.
CPC ............... *G01N 15/04* (2013.01); *C09K 8/80* (2013.01); *C09K 2208/28* (2013.01); *G06T 2207/10024* (2013.01); *G06T 2207/20132* (2013.01)

(58) Field of Classification Search
CPC ...... G01N 15/04; C09K 8/80; C09K 2208/28; G06T 2207/10024; G06T 2207/20132
See application file for complete search history.

(56) References Cited

U.S. PATENT DOCUMENTS

| | | |
|---|---|---|
| 9,828,844 B2 | 11/2017 | Zhou |
| 2010/0018294 A1 | 1/2010 | Toumukayakul |
| 2011/0219856 A1* | 9/2011 | Tonmukayakul ...... G01N 11/02 73/54.01 |
| 2015/0000910 A1 | 1/2015 | Russell |

(Continued)

OTHER PUBLICATIONS

International Search Report and Written Opinion mailed Feb. 23, 2023 in corresponding PCT Application No. PCT/US22/46180.

(Continued)

*Primary Examiner* — Nathaniel J Kolb
(74) *Attorney, Agent, or Firm* — Hogan Lovells US LLP (57) ABSTRACT

A method to determine the velocity of static proppant settling in fracturing fluids. The proppant carrying capability of different friction reducer products can be compared, so the appropriate friction reducer product can be selected for hydraulic fracturing operations. The effect of friction reducer concentrations in the fracturing fluids, the salinity and hardness of the fracturing fluids, and the proppant size on the velocity of static proppant settling can be studied to optimize the chemical structures of the friction reducers in the process of synthesis and optimize the hydraulic fracturing operation, e.g. to determine the proper concentration of friction reducers according to the salinity and proppant size.

9 Claims, 9 Drawing Sheets

(56) References Cited

U.S. PATENT DOCUMENTS

2020/0190397 A1 6/2020 Seymour-Loya
2020/0190978 A1* 6/2020 McDaniel ............... E21B 49/08

OTHER PUBLICATIONS

Xu et al., "Predicting fiber drag coefficient and settling velocity of sphere in fiber containing Newtonian fluids," Sep. 22, 2017, Journal of Petroleum Science and Engineering, vol. 159, pp. 409-418.
Wei et al., "Determination of the effect of resin-coating on ceramic proppant settlement for optimal hydraulic fracturing applications," Jun. 18, 2020, Power Technology, vol. 373, p. 109-117.
Luo et al., "Experimental Investigation of Particle Agglomeration Effects on Slurry Settling in Viscous Fluid," Nov. 13, 2017, Transport in Porous Media, vol. 121, p. 333-352.

* cited by examiner

APPARATUS AND METHOD FOR DETERMINING THE STATIC PROPPANT-SETTLING-VELOCITY IN FRACTURING FLUIDS

BACKGROUND

Field of Invention

The disclosure relates generally to fracturing fluid formulations and specifically to using proppant settling times to determine optimal friction reducer formulations for use in a fracturing fluid.

Description of the Prior Art

Hydrocarbons such as oil and gas may be produced from wells that are drilled into hydrocarbon reservoirs. For reservoirs which are of low permeability or with formation damage, the flow of the hydrocarbon into the production wells may be undesirably low. In these cases, the wells are often stimulated by hydraulic fracturing operations. For hydraulic fracturing treatment, a pad, which is a viscous fluid free of proppants, is first pumped at a rate and pressure high enough to break down the formation to creates fractures. A fracturing fluid (carrying fluid) is then pumped to transport proppants such as sand and ceramic particles into the fractures to keep the fractures open for the hydrocarbons to flow to the wellbore of the well. The proppant carrying capability is one of the most important properties of the carrying fluids. These fluids can be guar-based linear gels and polyacrylamide-based friction reducer solutions. With a high proppant carrying capability, the carrying fluid may transport the proppant into the fractures far away from the wellbore to increase the surface area in contact to the wellbore. The temperature of the reservoirs, the concentration and chemical structure of the polymer in the carrying fluids, the salinity and hardness of the fluids, and the size and density of the proppants can affect the proppant settling in the carrying fluids.

As such, the determination of the correct concentration and formulation of friction reducers in the carrying fluid is critical for efficient hydrocarbon recovery. Currently, two methods are used to qualitatively estimate properties of the proppant in a fracturing fluid. First, proppant settling can be estimated through visual observations. Second, a proppant transportation test can also visually observe proppant settling in slots through simulated transportation. Neither method can provide quantitative data to measure these settling properties. Therefore, there is a need in the art for a method of determining optimal friction reducer loading and formulation for varying reservoir properties.

SUMMARY

One embodiment of the present invention can provide for an apparatus for measuring proppant settling velocities. The apparatus can include a transparent container that is filled with a fracturing fluid. The apparatus can further include a camera to record a number of images over set time intervals. The apparatus can also include a computer to analyze the images taken by the camera.

In some embodiments, the transparent container can be in the shape of a circle, triangle, square, or hexagon. The fracturing fluid can further include a proppant and a friction reducer. The proppant can be sized between 8 and 140 mesh and can be present in the fracturing fluid in concentrations between 0.25 lb./gal and 6 lb./gal. The friction reducer can be a polyacrylamide-based friction reducer and can be present at concentrations between 0.01 gpt and 30 gpt in the fracturing fluid.

In some embodiments, the camera can take images at intervals from each second to every 6 hours. The computer can further include image analysis software. In some embodiments, that software is ImageJ. In other embodiments, the fracturing fluid can also include a guar-based linear gel.

A second embodiment of the present technology provides for a method of determining a settling height of a proppant. First, a fracturing fluid with proppant and friction reducer can be placed in a transparent container. Photos can be taken of the fracturing fluid over predetermined intervals of time. The images can be uploaded to a computer where they can be analyzed to determine the settling height of the proppant.

In some embodiments, the photos can be cropped before they are analyzed. The analysis can include a color threshold measurement to determine saturation values of the photos. These measurements can further include the generation of saturation histograms. In alternate embodiments, the analysis can be a brightness analysis. The determination of the settling time and height can be performed by one or more macros.

A third embodiment of the present invention provides a method of determining settling velocities of a proppant in a fracturing fluid. In the method, photos of the proppant in the fracturing fluid can be taken over time. The photos can be analyzed by a computer to determine the settling height in each of the photos. This can be used to determine the settling velocity by identifying a time period with a constant change in settling height for each time period.

In some embodiments, the analysis can be a color threshold measure to determine saturation values of the photos. The photos can be taken in intervals from 1 second to 6 hours. In some embodiments, a second period of time can be identified with accelerating velocities. Additionally, a third period of time can be identified with decelerating velocities. Both of these periods of time can be excluded from the settling velocity calculation.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

The present invention relates to an apparatus and method for the analysis of images generated from static proppant settling in fracturing fluids with friction reducers. Particularly, the apparatus and method provided can be used for determining the velocity of static settling of proppant in the fracturing fluids. This can be useful for optimization of the concentration of friction reducers in the fracturing fluids for the field applications. This can also be used for optimization of the chemical structures of the friction reducers such as polyacrylamide-based friction reducers during synthesis of the friction reducer.

In general, the apparatus and method for determining the velocity of static settling of proppant in hydraulic fracturing fluids functions is as follows. Fracturing fluids with proppant uniformly mixed can be poured in a transparent container. Images can be continuously taken of the static proppant settling in fracturing fluids with a fixed camera which can be set to take images automatically. The velocity of static proppant settling can be determined by tracking the position through image analysis of a specific proppant concentration determined with a selected saturation range.

Figure 1:
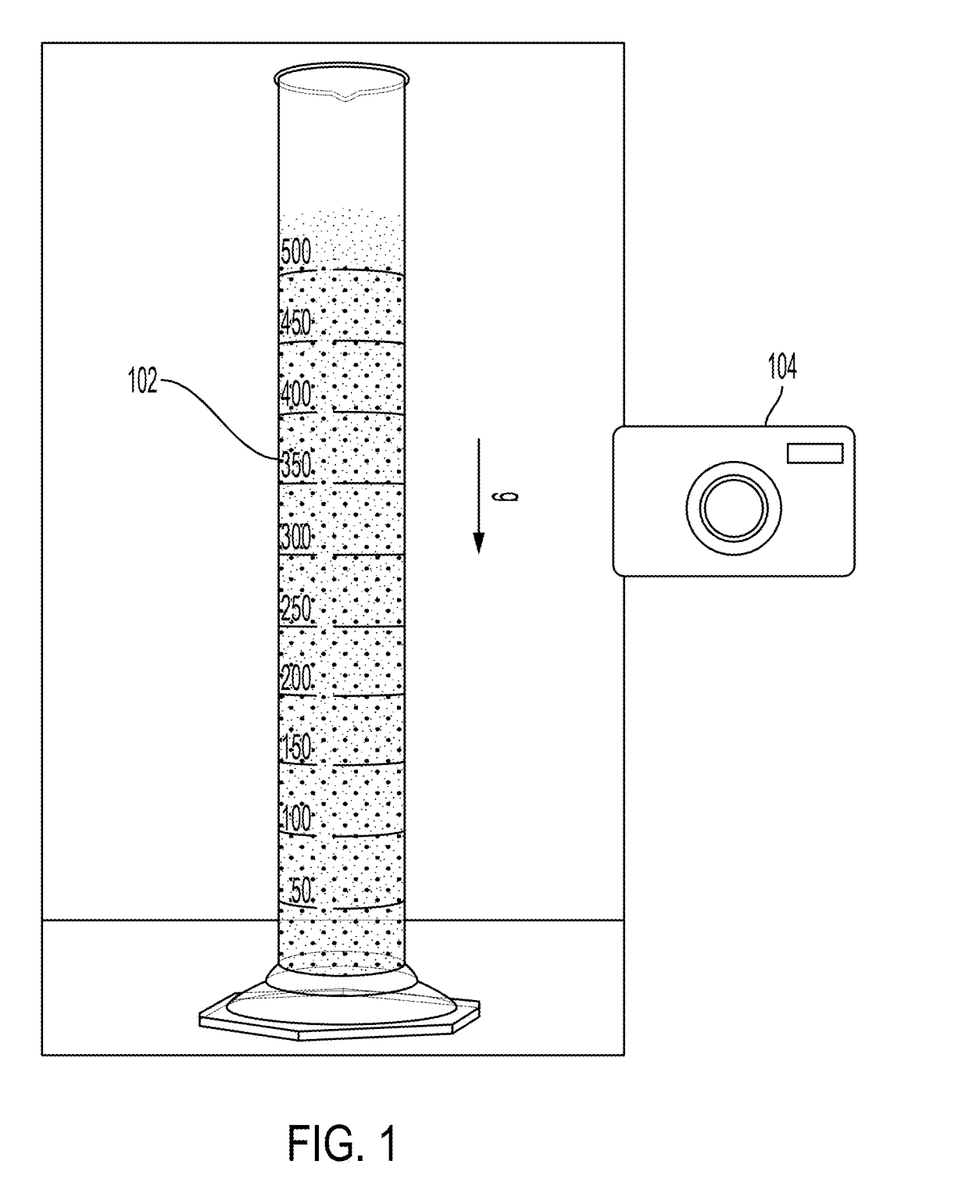
FIG. 1 is an apparatus for measuring proppant settling velocities according to an embodiment of the present disclosure.

FIG. 1 is an embodiment of the apparatus according to one embodiment of the present technology. The apparatus can include a transparent container 102 and camera 104. The transparent container 102 can be any kind of shape such as a circle, triangle, square, hexagon, or any other appropriate configuration.

The transparent container 102 can be filled with a fracturing fluid as shown in FIG. 1. The fracturing fluid can include a proppant and a friction reducer. The proppant can be sand, ceramic particles, glass beads, or any other solid particle known in the art for use as a proppant. In embodiments of the invention, the proppant sizes can be between 8 and 140 mesh (105 μm-2.38 mm), 16-30 mesh (595 μm-1190 μm), 20-40 mesh (400 μm-841 μm), 30-50 mesh (297 μm-595 μm), 40-70 mesh (210 μm-400 μm) or 70-140 mesh (105 μm-210 μm). The proppant concentration can be any value between 0.25 lbm/galUS and 6 lbm/galUS (30 kg/m 3 to 719 kg/m 3) in the fracturing fluids.

The friction reducer in the fracturing fluid can be polyacrylamide-based friction reducer or any other appropriate friction reducer known in the art. The concentration of the friction reducers in the fracturing fluids can be any value between 0.01 gpt (gallon per thousand gallons) and 30 gpt. The fracturing fluid can also be a linear gel fracturing fluid.

The camera 104 can be any appropriate camera with the ability to take images at certain time intervals by itself or through an external controller connected to the camera. The time intervals can be from about 1 second to about 6 hours between each photo.

Figure 2:
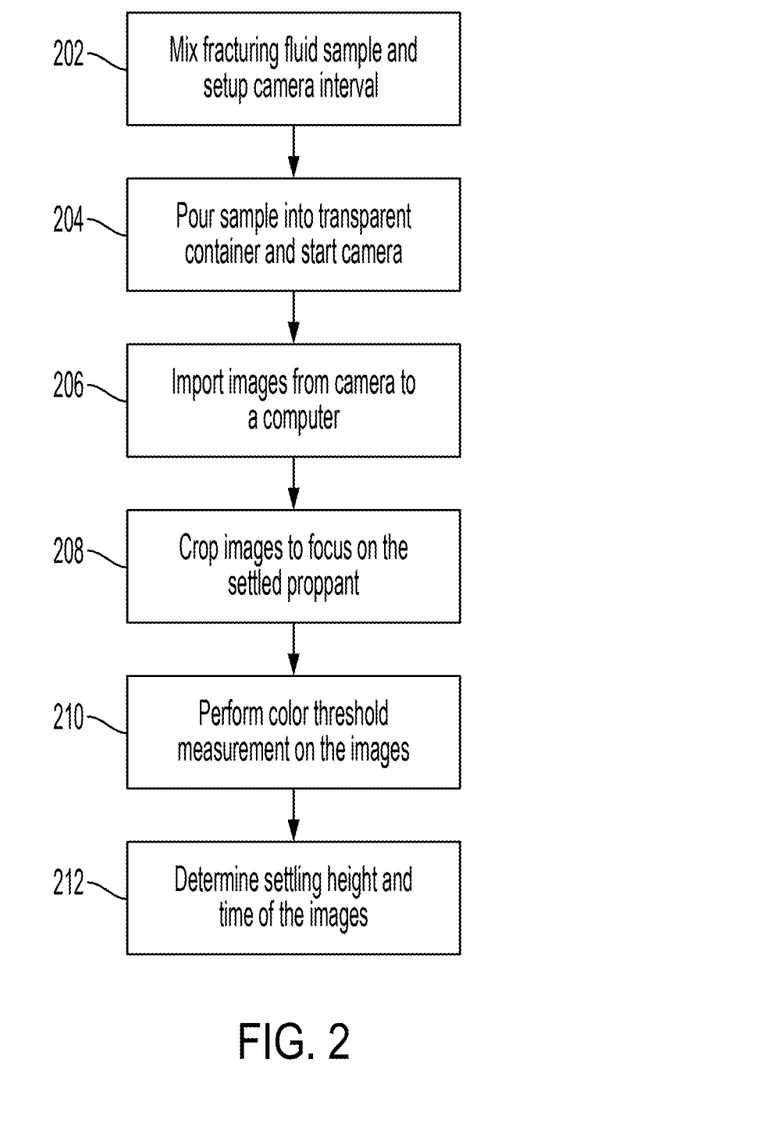
FIG. 2 is a method of determining settling height of a proppant according to an embodiment of the present technology.

FIG. 2 is an embodiment of a method of determining proppant settling according to an embodiment of the present invention. In step 202 the system can be setup by mixing the fracturing fluid sample to be tested and setting the image interval of the camera. The sample can be poured into the transparent container in step 204 and the camera can start to take the images. The images can be taken for a set time duration or can be stopped manually based on visual observations of the fracturing fluid samples.

Figure 3A:
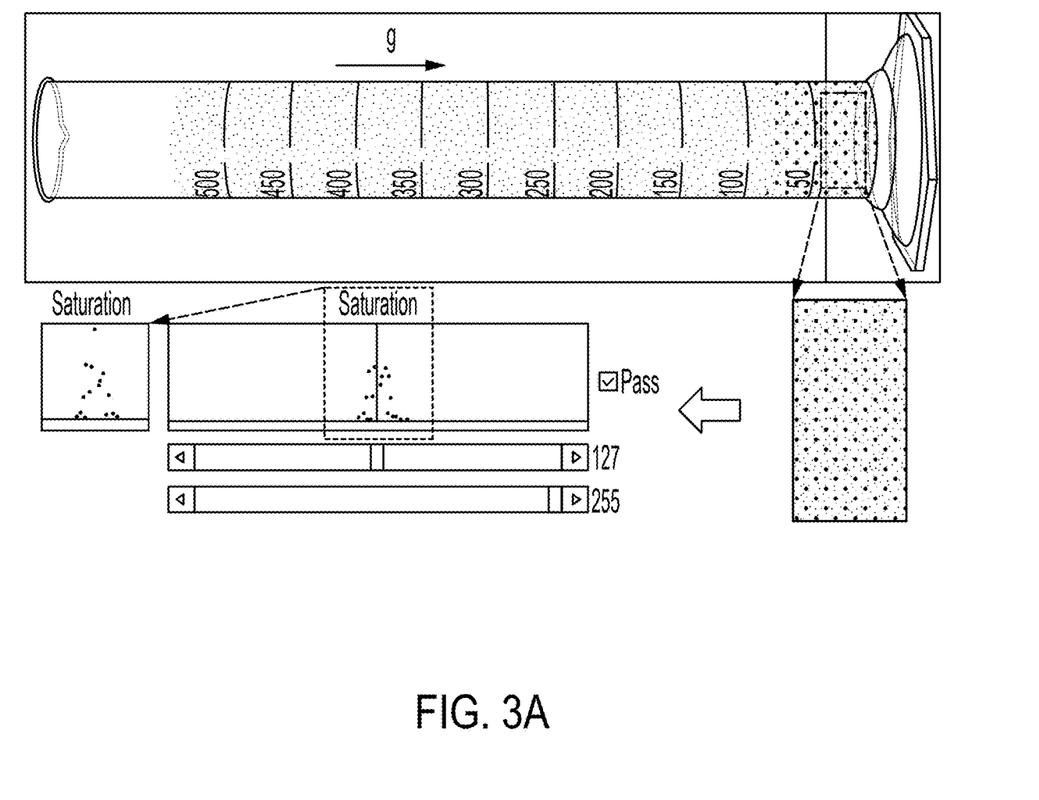
FIG. 3A is an exemplary embodiment showing the initial photo, cropped image, and resulting saturation evaluation.

In step 206, the images can be imported to a computer for analysis. To analyze the images, the images can first be cropped in step 208 to include only the part of the images that is to be analyzed. This can be the region where the proppant has settled within the transparent container. A color threshold measure can then be run on the resultant cropped image to determine saturation values at different heights within the transparent container in step 210. This can result in saturation histograms of the image. The range from the analysis can be from half of the peak in the previous photo to 255. An example of this can be seen in FIG. 3A. Here, the image of the transparent container (shown in full) was cropped to the resultant image in the lower right corner and a saturation analysis was performed. The saturation analysis can be performed by the ImageJ image processing program or any appropriate software known in the art. In alternate embodiments, an analysis of brightness can be used on the images instead of saturation.

Figure 3B:
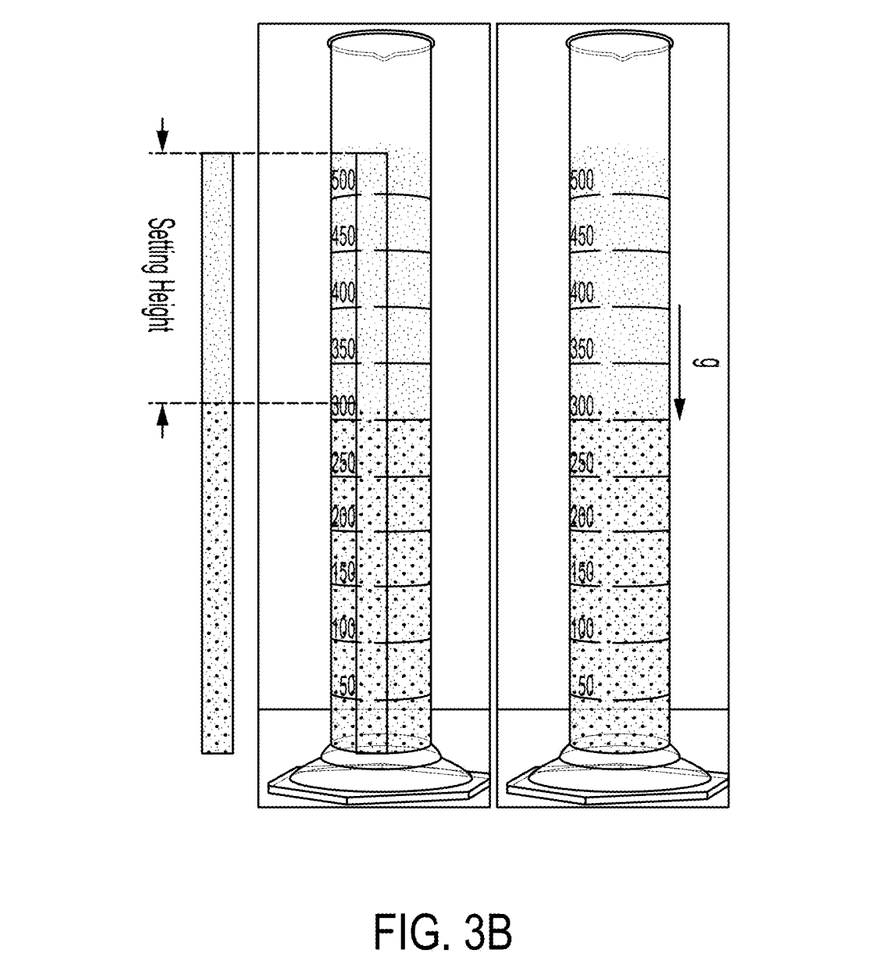
FIG. 3B is an exemplary embodiment showing a measurement of settling height based on the saturation evaluation.
Figure 4:
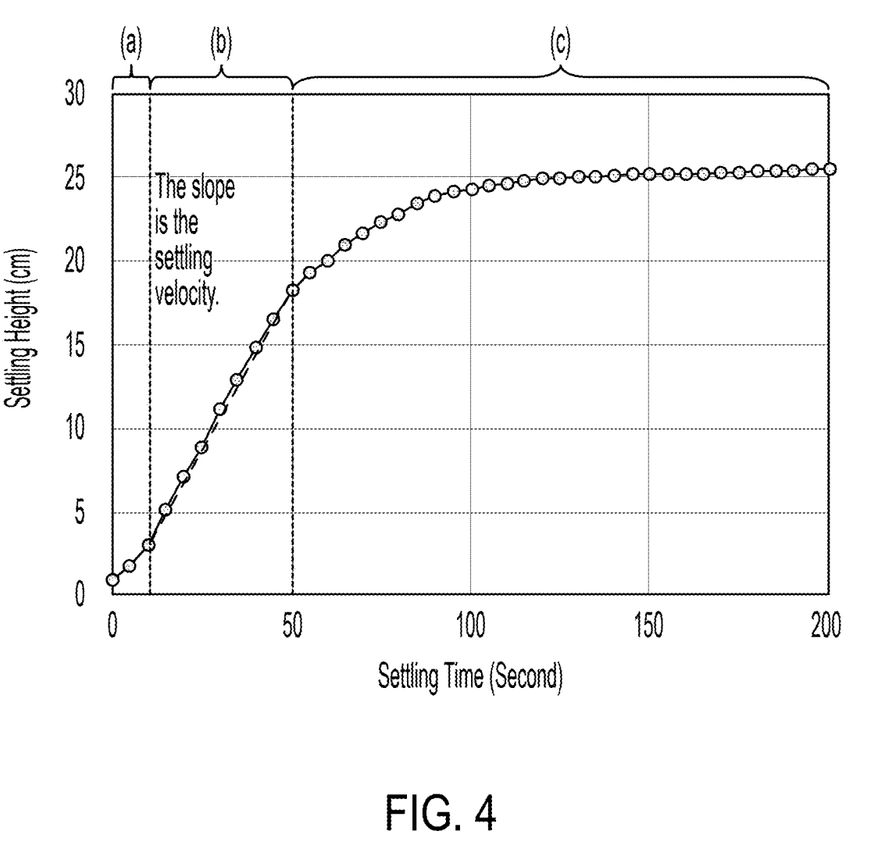
FIG. 4 is an exemplary settling curve of a proppant over time according to an embodiment of the present technology.

The saturation analysis can be used to determine a settling height at the time the image was taken in step 212. An example of this can be seen in FIG. 3B. This can be repeated for each of the images taken. In some embodiments, one or more macros can be used to determine settling heights and settling times for each of the images. This can result in a graph as shown in FIG. 4. The graph can include three separate time periods as denoted in this figure. Time period (a) can be an initial unsteady state at the beginning of the analysis where the proppant can be accelerating due to gravity. Time period (b) depicts an interval where the settling height can change with a constant rate over time. The slope of this interval (change in height over time) can be the settling velocity of the proppant. Finally, time period (c) depicts where the settling velocity can decelerate as the proppant reaches a final settling height.

Generally, the settling velocity can be used to evaluate the proppant carrying capacity of the fracturing fluid. Lower settling velocities can result in better carrying capability of the fracturing fluid. This can then be used to select the correct friction reducer product and concentration for the fracturing operation.

Figure 5:
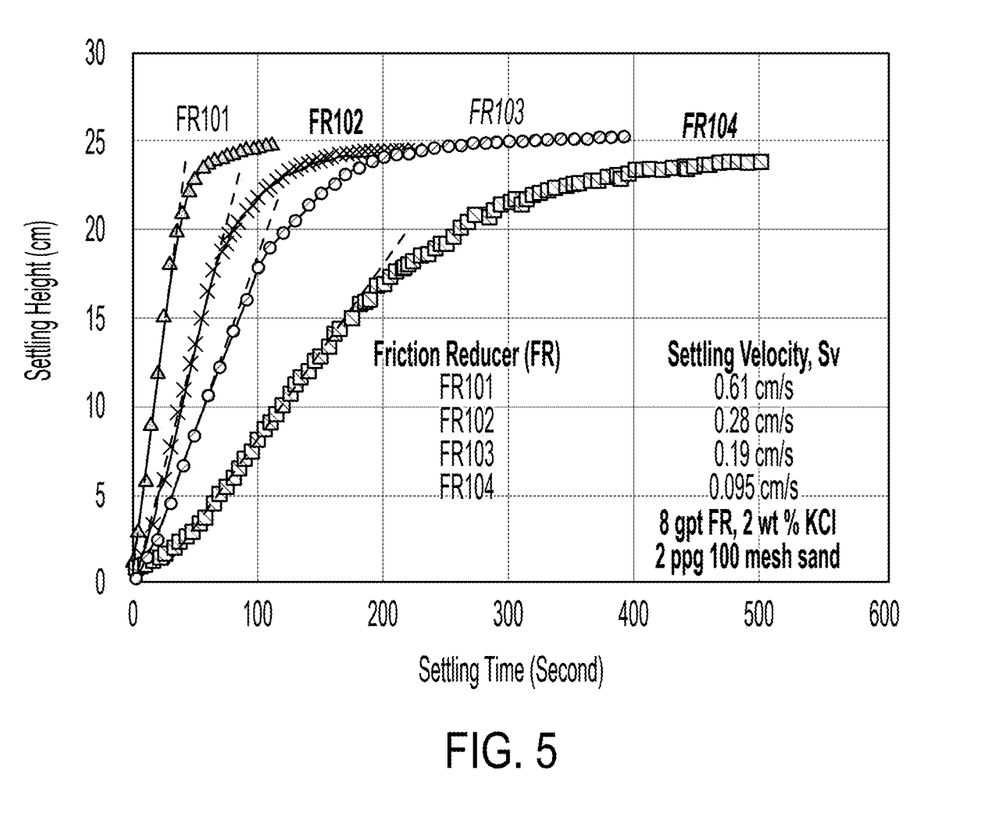
FIG. 5 is experimental results from varying types of friction reducer in the method of the present invention.

FIGS. 5-8 are exemplary embodiments of how the apparatus and method can determine different settling velocities based on different fracturing fluid conditions. FIG. 5 is an embodiment of how different friction reducers change the settling velocity of the proppant. In the experiment, the brine used for preparing the fracturing fluids was 2 wt % KCl. The concentrations of the friction reducers were all 8 gpt. The proppant with a concentration of 2 ppg (pound per gallon) was 100 mesh sand. Four different polyacrylamide-based friction reducers were tested with the resulting settling velocities between 0.61 cm/s and 0.095 cm/s.

Figure 6:
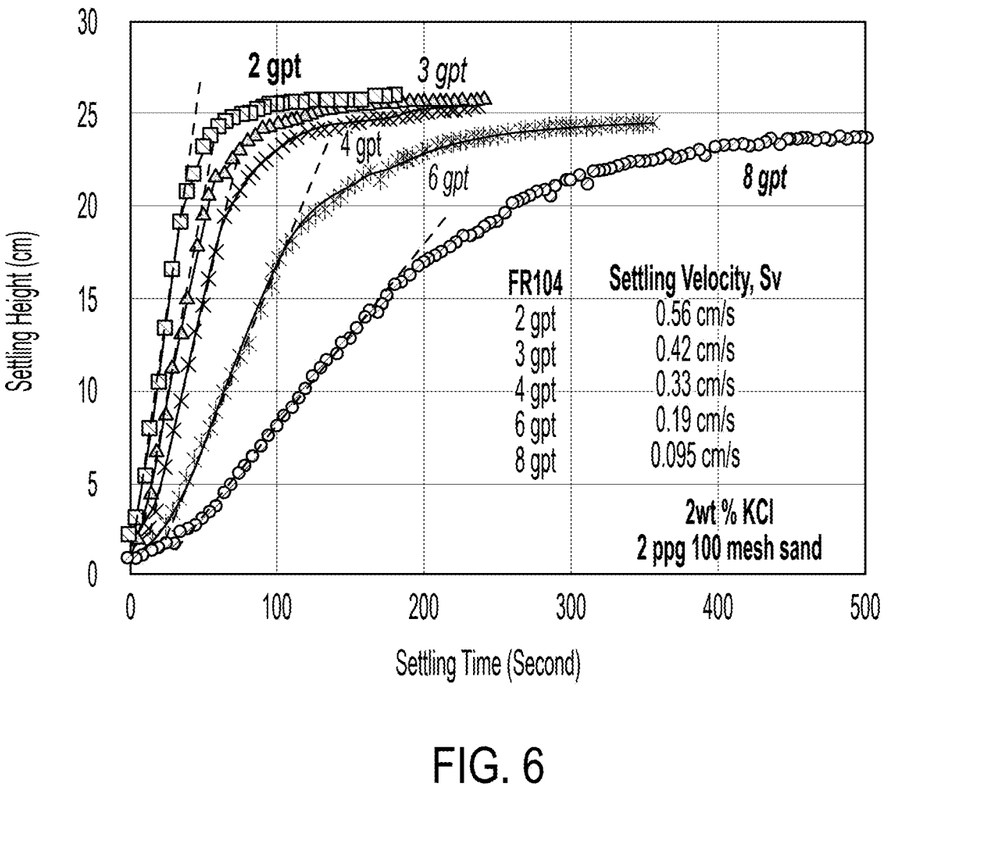
FIG. 6 is experimental results from varying concentrations of a friction reducer in the method of the present invention.

FIG. 6 depicts an embodiment of how friction reducer concentration can affect settling velocity. In this example, friction reducer 104 was selected and varied between 2 and 8 gpt while the proppant and brine conditions were left the same as shown in FIG. 5. The change in friction reducer concentration resulted in settling velocities between 0.56 cm/s and 0.095 cm/s.

Figure 7:
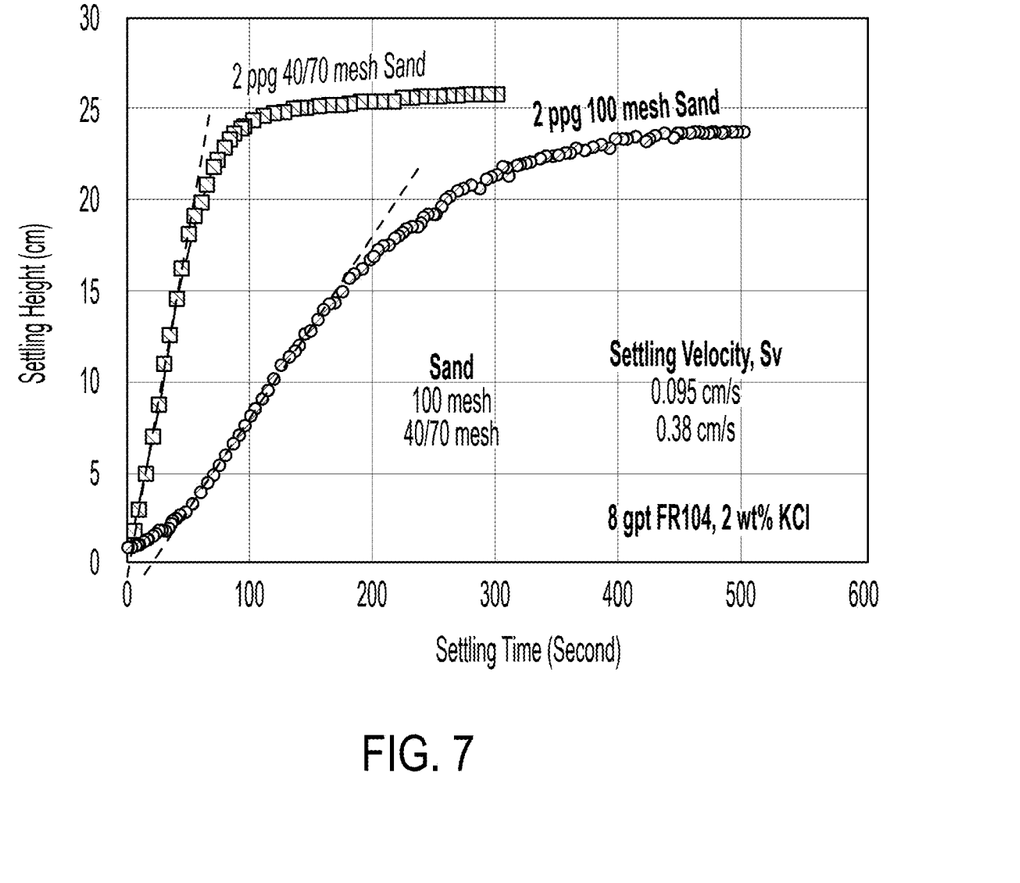
FIG. 7 is experimental results from varying types of a proppant in the method of the present invention.

FIG. 7 is an embodiment where the proppant is varied between a 40/70 mesh sand and 100 mesh sand. In this embodiment, the brine properties, type of friction reducer, and concentration of friction reducer are kept constant. The variation in the proppant results in the settling velocity changing from 0.095 cm/s to 0.38 cm/s.

Figure 8:
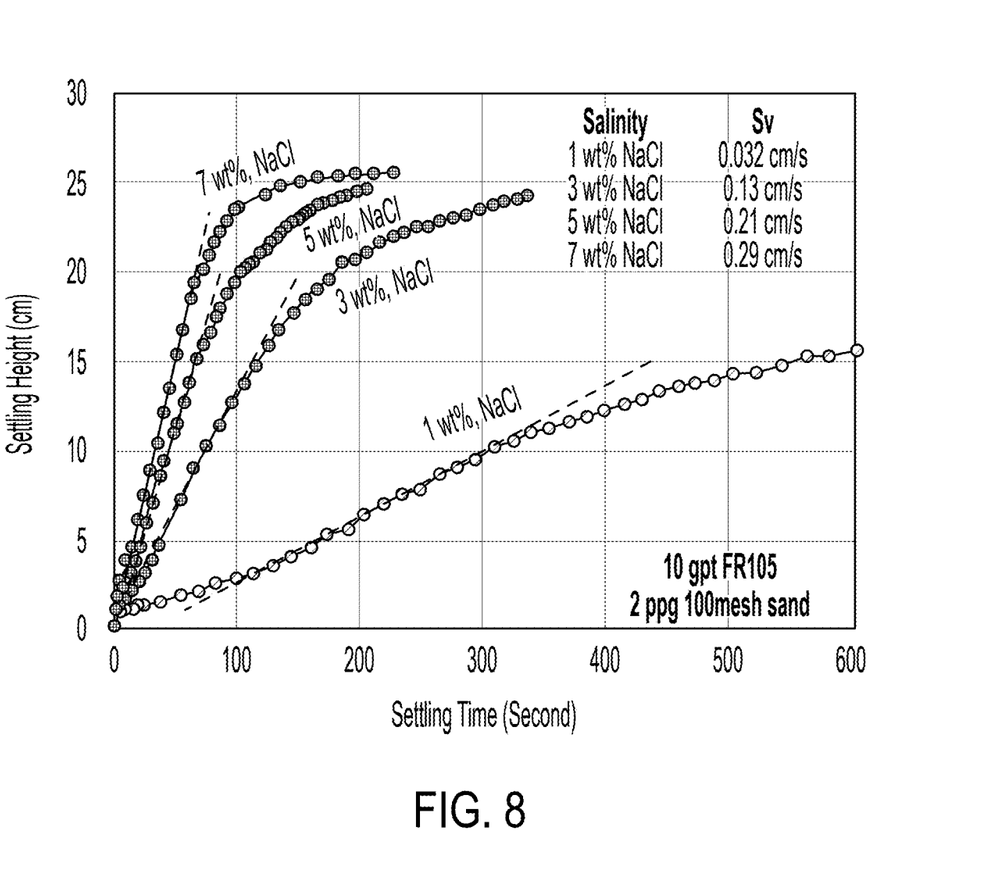
FIG. 8 is experimental results from varying the brine of the fracturing fluid in the method of the present invention.

FIG. 8 shows an embodiment where the brine concentrations are varied between experiments. Here, the salt in the brine is varied between 7 wt % and 1 wt % of the solution. The type and concentration of the friction reducer and proppant are kept constant. The experiments resulted in settling velocities between 0.032 cm/s and 0.29 cm/s.

Although the technology herein has been described with reference to embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

That claimed is:

1. A method of determining a settling velocity of a proppant in a fracturing fluid, comprising:
    taking a plurality of images of the proppant in the fracturing fluid over time;
    analyzing the plurality of images to determine a settling height for each of the plurality of images, thereby determining settling heights over time;
    determining the settling velocity by finding a first period of time comprising a portion of the settling heights at three or more points of time, wherein the portion of the settling heights is substantially linear over the three or more points of time; and
    identifying a second period of time with accelerating settling velocities to exclude from the settling velocity determination.

2. The method of claim 1, wherein analyzing the plurality of images further comprises performing a color threshold measurement to determine saturation values of the plurality of images.

3. The method of claim 1, wherein the plurality of images are taken at intervals from about 1 second to about 6 hours.

4. The method of claim 1, further comprising:
    identifying a third period of time with decelerating settling velocities to exclude from the settling velocity calculations.

5. The method of claim 1, wherein the plurality of images is taken by a camera.

6. The method of claim 1, wherein the fracturing fluid further comprises a friction reducer.

7. The method of claim 6, wherein the friction reducer is a polyacrylamide-based friction reducer.

8. The method of claim 7, wherein the friction reducer is present in the fracturing fluid at concentrations between about 0.01 gpt and 30 gpt.

9. The method of claim 1, wherein the fracturing fluid further comprises a guar-based linear gel.

\* \* \* \* \*